United States Patent Office — 3,267,079 — Patented August 16, 1966

3,267,079
WATER SOLUBLE ALKYLENE OXIDE MODIFIED POLYURETHANE COMPOSITION
Edgar Dare Bolinger, Spartanburg, S.C., assignor to Deering Milliken Research Corporation, Spartanburg, S.C., a corporation of Delaware
No Drawing. Filed Feb. 7, 1964, Ser. No. 343,924
29 Claims. (Cl. 260—77.5)

The present invention which is a continuation-in-part of copending application Serial Number 24,885 filed April 27, 1960, now abandoned relates to a process for the production of novel monofunctional epoxide modified, water soluble polymers of polyalkylene ether glycols and diisocyanates, to polymers thus produced and to uses therefor, particularly in the sizing of textile yarns.

The new polymers of the invention are useful as textile sizes, as washable protective coatings for fruits and vegetables, as adhesives and binders in the textile, leather and paper industries and as intermediates in the production of synthetic resins for casting, coating and molding with and without fillers, dyes and pigments.

Heretofore, starch has been used almost exclusively as the basic ingredient of textile yarn sizing formulas. Some advances have been made in the use of synthetic size materials other than modified starch, especially in connection with synthetic yarns. However, earlier synthetic sizing materials have met with limited success because of their high cost and because they are useful only with a limited number of fibers. Polyethylene glycol terephthalic acid ester yarn, e.g., Dacron, has been a particularly difficult fiber to size with known sizing materials and sizing spun Dacron yarn has remained a major textile problem prior to this invention.

It is an object of this invention to provide high molecular weight, water-soluble, tough, flexible, film-forming epoxide modified polymers of polyalkylene ether glycols and diisocyanates and a process for their production.

Another object of this invention is to provide compositions and a process for their production, which can be used as sizes for textile yarns in general and spun and filament polyethylene glycol terephthalic acid ester yarns in particular, employing conventional equipment, thereby producing sized yarns having excellent weaving efficiency and minimum shedding. Another object of the invention is the provision of a synthetic size which can be desized with plain water and disposed of in streams without seriously polluting them.

These and other objects of the invention will be more readily apparent from the following detailed description.

The novel polymers of this invention are particularly characterized by their water-solubility and their film-forming properties They are readily water soluble, making them easy to apply to textile yarns as a size, and they retain their solubility so that desizing may be accomplished by a simple water wash. The films formed from water solutions of these new polymers although water soluble are very flexible and strong. The water-insoluble reaction products of polyalkylene ether glycols and diisocyanates are not suitable sizing materials as they are not readily applicable to the yarn or removable from the fabric. Water insoluble epoxide modified reaction products such as are set forth in U.S. Patent No. 2,835,653 are also unsuitable for use as sizing materials. Water insoluble products are produced in U.S. Patent No. 2,835,653 both as a result of the high molecular weight of the polyalkylene ether glycols and diisocyanate reaction product and as a result of extensive polymerization of the epoxide modifying agent.

The water-soluble epoxide modified reaction products of polyalkylene ether glycols and diisocyanates of this invention have outstanding advantages over prior art sizing materials in weaving efficiency and in terms of running efficiency on conventional slashers. Good yarn penetration, even in the absence of a separate wetting agent, is obtained at any normal operating temperature. Hard size at the squeeze rolls is substantially eliminated. There is no sticking on conventional drying cans. Separation of the yarns at the split rods is smooth and even, and broken ends seldom, if ever, appear. At the same time, the size holds the fibers of individual yarns in a very close, tight, unitary relationship for efficient weaving. Spun Dacron yarns, for example, are so adhesively bound by the size of this invention that their diameter is reduced by the sizing operation and the same yarns separate at a greater distance ahead of the split rods than the same yarns sized with conventional materials.

Water soluble polymers of polyalkylene ether glycols and diisocyanates which are not modified by reaction with an epoxide, while performing as a size in a manner superior to most sizes presently available, are somewhat too moisture sensitive for use in relatively humid atmospheres. Thus, when the humidity of a weaving room exceeds about 55% relative humidity, the size tends to become tacky, thereby reducing weaving efficiency. However, when these polymers are modified in the manner described hereinafter, the moisture sensitivity of the size is significantly reduced, thus rendering the size more versatile.

The products of the invention are produced by a three-step reaction, i.e., polyalkylene ether glycol diisocyanate polymer production, reaction with an epoxide to block the amide group and as a final reaction, chain terminating the polymer. These reactions are believed to proceed substantially as shown below:

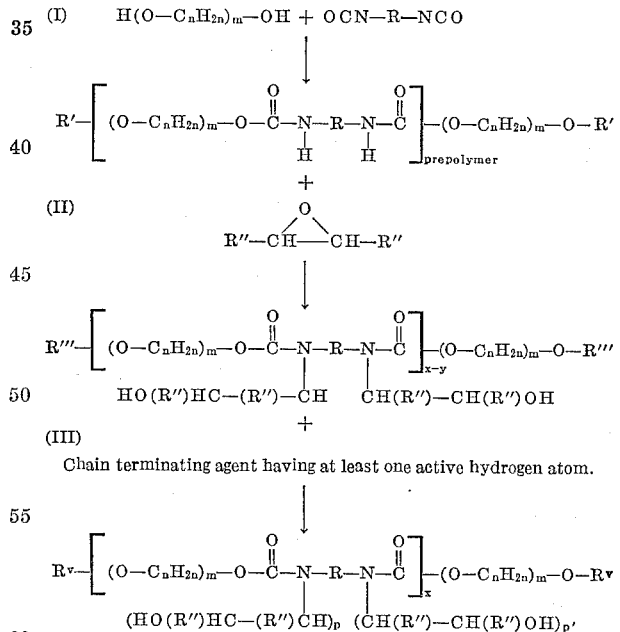

$n$ = an integer from about 2 to about 8, inclusive;
$m$ = an integer from about 15 to about 450, inclusive;
R = divalent nonreactive aliphatic or aromatic radical;

R″ = H or nonreactive aliphatic or aromatic radical;

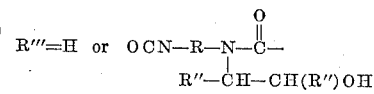

$$R^v = H \text{ or } R^{iv} - \overset{O}{\underset{|}{C}} - NH - R - \overset{O}{\underset{|}{N}} - \overset{||}{C} -$$
$$CH(R'') - CH(R''')OH$$

wherein $R^{iv}$ is an organic anionic residue having lost at least one active hydrogen atom $x$ is an integer of at least 10

$y$ is an integer significantly smaller than $x$ $p$ and $p'$ are two integers the sum of which is from about 0.1 to about 2.0.

The maximum value which may be assigned to $x$ is that value which will produce a polymer approaching water insolubility.

$R'$, $R'''$ and $R^v$ are H in some of the molecules when less than a molar equivalent of diisocyanate is employed per mole of polyalkylene ether glycol; the lower the proportion of diisocyanate to glycol, the more frequently $R'$, $R'''$ and $R^v$ will be H. When the molar proportion of diisocyanate to glycol is 0.5 to 1 then $R'$, $R'''$ and $R^v$ will, for the most part, be H. It is preferred, however, that the diisocyanate be employed in excess of stoichiometric quantities, in which case $R'$ and $R'''$ will be an isocyanate group and $R^v$ will be an isocyanate reacted with a chain terminating agent.

The product of this invention is preferably a product having the following general formula:

$$R^v - \left[ (O-C_nH_{2n})_m - O - \overset{O}{\overset{||}{C}} - \underset{\underset{CH_2}{|}}{\underset{(OHCHCH_2)_p}{N}} - R - \underset{\underset{CH_3}{|}}{\underset{(CH_2CHOH)_{p'}}{N}} - \overset{O}{\overset{||}{C}} \right]_x - (O-C_nH_{2n})_m - O - R^v$$

wherein $n$ = an integer from 2 to 8, inclusive;

$m$ = an integer from about 15 to 450, inclusive;

R = divalent nonreactive aliphatic or aromatic radical;

$$R^v = H \text{ or } R^{iv} - \overset{O}{\overset{||}{C}} - NH - R - \overset{O}{\underset{|}{N}} - \overset{||}{C} -$$
$$CH_2 - CHOH$$
$$CH_3$$

wherein $R^{iv}$ is an organic anionic residue having lost at least one active hydrogen atom $x$ = an integer of at least 10

$p$ and $p'$ = two integers the sum of which is from 0.1 to 2.0.

The product of this invention is most preferably a product having the following formula:

$$\overset{O}{\overset{||}{C}}-\text{Alkoxy} \qquad\qquad \text{Alkoxy}-\overset{O}{\overset{||}{C}}$$
$$NH \qquad\qquad\qquad\qquad NH$$
$$\underset{CH_2CHOH}{\underset{|}{N}}-\overset{R}{\underset{|}{C}}-\overset{O}{\overset{||}{}}\left[(OCH_2CH_2)_m-O-\overset{O}{\overset{||}{C}}-\underset{(OHCHCH_2)_p}{\underset{|}{N}}-R-\underset{(CH_2CHOH)_{p'}}{\underset{|}{N}}-\overset{O}{\overset{||}{C}}\right]_x-(OCH_2CH)_m-O-\overset{O}{\overset{||}{C}}-\underset{HOHC-CH_2}{\underset{|}{N}}$$
$$CH_3 \qquad CH_3 \qquad\qquad CH_3 \qquad\qquad CH_3$$

wherein $m$ = an integer from about 15 to 450, inclusive;

R = divalent nonreactive aliphatic or aromatic radical;

$x$ = an integer of at least 10

$p$ and $p'$ = two integers the sum of which is from 0.1 to 2.0.

POLYMER PREPARATION (a) *Polyalkylene ether glycol diisocyanate polymer.*— In the first step in making the polymers according to this invention, a substantially anhydrous polymer of polyalkylene ether glycol having a molecular weight of from about 750 to 20,000 is catalytically reacted with at least 0.5, e.g., 0.6, 0.7, 0.8, and preferably at least about 1, e.g., 0.9 to 1.1, molar equivalent of a diisocyanate, preferably an aryl diisocyanate. In practice, slightly more than 1 molar equivalent of diisocyanate is ordinarily preferred. Ordinarily, less than 2 molar equivalents is used to avoid the danger of forming water-insoluble polymers and also because excess diisocyanate is not helpful, is wasteful and renders the process more expensive, and results in the production of impurities in the resulting polymer when it is chain terminated. The preferred molar ratio of diisocyanate to glycol is from about 1.1:1 to 1.5:1. When the molar ratio of diisocyanate to glycol is less than 1:1, the reaction product, if the reaction is permitted to go to completion, will have few, if any, terminal isocyanate groups, thus reducing the amount of chain termination agent required to ensure that the polymerization reaction is stopped at the desired viscosity. Thus, if the ratio is, e.g., 0.5:1, the reaction can be permitted to go to completion unless a lower molecular weight product is desired.

The term "polyalkylene ether glycol" as used throughout the specification and claims refers to polyethers which are derived from alkylene oxides or glycols which may be represented by the formula $HO(C_nH_{2n}O)_mH$, in which $n$ is an integer from 2 to 8 and $m$ is an integer between about 15 and about 450. Not all the alkylene radicals present need be the same, and polyether glycols containing a mixture of radicals can be used. These polyalkylene ether glycols are either viscous liquids or waxy solids. The molecular weights of the polyalkylene ether glycols which are most useful in the process of this invention are from about 2,000 to 10,000 and most desirably from about 4,000 to 8,000, e.g., 6,000 to 7,500. The preferred glycols are polyethylene ether glycols.

The term "substantially anhydrous polymer" is used to define a polymer containing less than about 0.5%, preferably less than 0.1%, moisture, i.e., containing only a trace of moisture. It has been found that some commercial polyalkylene ether glycols containing more than 0.5% moisture react improperly to provide films of poor strength, making them relatively unsuitable for textile sizes. In practice, the moisture content of the polyalkylene ether glycols should be kept as low as possible, e.g., by adding an aromatic solvent, e.g., benzene or toluene, and removing most of the water by azeotropic distillation.

Although the starting polymer and reaction mixture must be substantially anhydrous, the latter must not be completely anhydrous, as the reaction, to proceed properly, requires the presence of a trace of moisture, e.g., 10–500 parts per million, of the polyalkylene ether glycol. Thus, "substantially anhydrous" when used herein means almost but not completely anhydrous. If the polymer solution is rendered anhydrous by distilling the aromatic solvent, water should thereafter be added in the range of about 50 parts per million, e.g., 10 drops per 6 liters of reaction mixture, preferably after the addition of the diisocyanate and reaction catalyst.

A wide variety of diisocyanates can be used in this invention, but aryl, especially monophenyl diisocyanates are preferred. Suitable compounds include 2,4-tolylene diisocyanate, 2,6-tolylene diisocyanate, n-phenylene diisocyanate, 2-nitrodiphenylene-4,4'-diisocyanate, cyclohexylphenyl-4,4'-diisocyanate, hexamethylene diisocyanate, diphenylene-4,4' diisocyanate, diphenylmethane-4,4'-diisocyanate, di - para - xylylmethane-4,4'-diisocyanate, naphthylene-1,4-diisocyanate and the corresponding 1,5 and 2,7-isomers thereof, fluorene-2,7-diisocyanate, chlorophenylene-2,4-diisocyanate and dicyclohexylmethane-4,4'-diisocyanate.

Any catalyst known to be useful in the reaction of polyalkylene ether glycols with diisocyanates may be used in the present invention including the tertiary organic bases of U.S. Patent No. 2,692,874, e.g., triethylamine, pyridine, tri-n-butylphosphine, their acid salts and the like. However, it has been found that particularly good results are obtained by using organometal salts, e.g., cobalt naphthenate and similar salts of lead, zinc, copper and manganese.

The organic radicals may be either aliphatic or aromatic residues. Ordinarily only a very small amount of catalyst is required, e.g., from about 0.01 to 0.001% of the reactants.

Although the reaction can be conducted in the absence of a solvent, i.e., as a melt, it is ordinarily preferred to conduct the reaction in an inert solvent to avoid working with too viscous mixtures. Generally speaking, it is preferred to operate with reaction mixtures having a viscosity of less than 1,000,000 cps. Moreover, it is possible to reach this viscosity, when operating without a solvent and at a relatively low reaction temperature, before a reaction product is obtained which has optimum sizing properties.

Thus, it is ordinarily desirable to employ a reaction solvent. Aromatic hydrocarbon solvents, e.g., benzene, toluene and xylene, are preferred for several reasons. From a mechanical point, it is advantageous to keep the reaction mass at a viscosity below about 800,000 cps. However, if too much of a nonionic solvent is employed, it tends to interfere with the reaction and slow it down. Therefore, it is desirable to employ only that amount of solvent which will impart a viscosity to the reaction mixture in the range of about 100,000 to 1,000,000 cps. preferably around 200,000 to 800,000 cps. With toluene at 85° C., employing polyalkylene ether glycols of a molecular weight in the range of 6,000 to 7,500, this can be accomplished at an initial concentration of about 80% solids. As the reaction proceeds, the increasing molecular weight of the reaction product increases the viscosity of the reaction mixture, thus necessitating the gradual addition of more solvent throughout the reaction if about the same viscosity is to be maintained, e.g., until a final concentration of 65% solids is reached. This serves two purposes, i.e., maintaining the desired viscosity and also slowing down the reaction. Thus, as the reaction product approaches water insolubility or gelation because of its increasing molecular weight, the reaction rate tends to slow down due to the presence of the increasing amounts of solvent, thereby providing more leeway in the time at which the chain terminating agent must be added to prevent the production of a water insoluble reaction product. Although the amount of solvent employed can be varied considerably, e.g., from about 10% to 90% of the total reaction mixture, it is desirable, for the reasons given hereinabove, to employ amounts that will provide a reaction mixture having a 75-90% solids initial concentration and a 50-75% solids final concentration.

(b) *Epoxide reaction.*—The second step in the process of this invention involves the reaction of the polyalkylene ether glycol diisocyanate polymer with an epoxide. This reaction proceeds concomitantly with the primary polymer production, i.e., as soon as some polymer has been produced, it can react with the epoxide. Thus, although the epoxide can be added at almost any point during the primary polymer reaction, the only requirement is that at least the terminal portion of the polymer production is conducted in the presence of the epoxide. The preferred procedure involves adding the epoxide to the reaction mixture a few minutes, e.g., 5 to 30 minutes, before the polymer is chain terminated.

Examples of epoxides, preferably epioxides, which can be employed are the lower-hydrocarbon, i.e., containing from 2 to 12 carbon atoms, epoxides including styrene oxide, α-phenyl propylene oxide, trimethylene oxide, and the lower-alkylene oxides, i.e., epioxides containing from 2 to 8, preferably 2 to 4, carbon atoms, inclusive, e.g., ethylene oxide, propylene oxide, butylene oxide, isobutylene oxide. The epoxides preferably are monofunctional, i.e., contain no other groups reactive to the polymer.

The amount of epoxide which can be added to the polyethylene ether glycol diisocyanate polymer can be varied over a wide range, i.e., from about 0.1 mole per mole of diisocyanate to about 2 moles per mole of diisocyanate. The epoxide addition reaction is always conducted under conditions such that polymerization of the epoxide will be prevented, that is to say conducted under conditions such that not more than about 2 moles of epoxide will react per mole of diisocyanate. Conveniently, and preferably if the epoxide is volatile, an excess of the epoxide can be added and the excess removed by distillation or evaporation after the reaction has proceeded to completion.

The epoxide modified portion of the polymerization reaction is ordinarily conducted in substantially the same manner as the preceding portion of the polymerization reaction. However, when a particularly volatile epoxide is employed, e.g., ethylene oxide, it may sometimes be necessary to lower the reaction temperature or employ equipment to prevent excessive loss of the epoxide.

The temperature of the polymerization reaction including the epoxide modified portion, can be varied over a considerable range so long as the reaction is stopped at the desired point. However, the reaction proceeds slowly unless the temperature is above about 70° C. However, the temperature should not exceed 150° C., and preferably should not exceed 120° C. as higher temperatures tend to decompose the polyoxyalkylene chains. The preferred range is from about 80° C. to 95° C. The reaction time is a function of such factors as temperature, the reactants, catalyst and amount of solvent employed.

As stated above, the point at which the reaction should be modified by the addition of an epoxide so as to obtain a polymer that will provide tough flexible films which are readily water-soluble is not particularly critical, so long as the epoxide is added at least several minutes before the polymer reaches maximum permissible viscosity. Visual inspection of the reaction mass, i.e., its viscosity, reaction to stirring, stringiness, etc., provides a good guide and, with any given reactants, empirical viscosity determinations may be used. The optimum total polymerization reaction time, including the epoxide modified portion, can be determined by procedures described hereinafter. It should be understood that the addition of the epoxide does not substantially affect the viscosity of the final product, the viscosity of the final product being determined by the degree of polymerization of the polyalkylene ether glycol.

(c) *Chain termination.*—The chain termination of a polymer is a well known reaction in polymer chemistry. In this step, the terminal, reactive groups of the polymer are reacted with a nonchain extending compound which inactivates these groups. In the instant polymer, the reactive terminal groups are isocyanate groups. These groups merely require a nonchain extending compound having an active hydrogen, i.e., those hydrogen atoms which display activity according to the well known Zerewitinoff test. See J. Am. Chem. Soc., 49, 3181 (1927). For a discussion of diisocyanate chemistry, see National Aniline Division of Allied Chemical and Dye Corporation Technical Bulletin I-17 and the references cited therein. For the purposes of this invention, such compounds are limited to those which do not form unstable intermediate compounds or polymers, as would be apparent to those skilled in the art.

Some polyfunctional compounds, i.e., those having a plurality of active hydrogens, are not desirable because of the tendency of some of these compounds to produce further polymerization. The preferred chain terminating agents are thus those having only one active hydrogen. Suitable chain terminating agents are alcohols, ammonia, primary amines, cyclic secondary amines, inorganic salts having an active hydrogen, mercaptans, amides, alkanol amines, oximes, etc. The preferred class of compounds are the organic monohydroxy compounds, preferably monohydroxy alcohols and especially the saturated aliphatic alcohols, primary and secondary monoamino compounds, aryl monohydroxy compounds and the like. However, it has been found that in terms of weaving efficiency of the resulting polymer, lower alkanols, i.e., containing from one to eight carbon atoms, inclusive, are preferred, especially those containing less than 4 carbon atoms. Methanol, ethanol and isopropanol being both efficient and inexpensive, are excellent chain terminating agents for abruptly halting the polymerization reaction at the desired point.

The minimum amount of chain terminating agent which should be employed will vary according to the amount of diisocyanate used, its ratio to the glycol and the extent to which the polymerization reaction has proceeded. While a theoretical minimum may be readily calculated, e.g., 0.01–1 molar equivalents, it is preferred to add at least a molar equivalent for the isocyanate used, as a safe excess. Additional quantities are ordinarily not required although not harmful.

The total polymerization time, i.e., including the epoxide modified portion, can vary considerably depending, in part, on the molecular weight of the starting polyalkylene ether glycol, the reaction temperature, the catalyst and amount of solvent employed. If the reaction time is too short, under the selected conditions, the resulting polymer will produce a relatively weak, brittle size. Conversely, if the reaction time is too long, the reaction product will not be water soluble.

The exact limits of reaction time, under a particular set of reaction conditions, can be determined by removing weighed samples from the reaction mixture from time to time, chain terminating the sample with a lower alkanol, e.g., ethanol, and then making a 25% aqueous solution thereof, while removing whatever reaction solvent may be present. If the aqueous solution has a viscosity at 25° C. of at least 10,000 cps., and preferably between about 20,000 and 30,000 cps., the desired reaction product can be obtained from the reaction mixture upon chain termination thereof. Obviously, if the alcohol stopped sample is water insoluble, the reaction has proceeded too far and the reaction time was too long.

Another convenient index for determining the course of reaction is the viscosity of the reaction mixture. If the reaction is conducted at 85° C. with toluene as a reaction solvent, a 65% solution of the reaction mixture should have a viscosity in the range of 100,000 to 1,000,000 cps. As stated before, such a reaction mixture produces a highly satisfactory size if chain terminated at a viscosity of around 200,000–800,000 cps.

In carrying out a preferred method of the above described process, the selected polyalkylene ether glycol is dissolved in an inert aromatic hydrocarbon solvent. It is preferred that the resulting solution have a water content of less than about 500 parts per million and more preferably less than 100 parts per million. To better control the reaction, it is preferred to remove any water present in the glycol solution by azeotropic distillation, e.g., with toluene, until the mixture is substantially anhydrous. The selected diisocyanate is then added followed by the reaction catalyst. Water can then slowly be added to achieve the desired reaction rate, preferably in the range of about 10–100 parts per million. As the reaction proceeds and the viscosity increases, more solvent is added to keep the viscosity within the preferred range. When a 65% solution of the reaction mixture reaches the lower limit of preferred viscosity, an excess of the epoxide is added employing whatever equipment is necessary to prevent loss of the epoxide from the mixture. When the desired ultimate viscosity is reached, the selected chain terminating agent is added. When the reaction has completely stopped, water is added and the aromatic solvent stripped from the mixture. The aqueous residue can then be diluted to a standard concentration.

Sizing yarns with a size of this invention can be performed according to usual procedures. The novel polymers can be dissolved in water and used at any temperature between room temperature and the boil. However, excellent yarn penetration is obtained, at temperatures between 120° F. and 180° F. and higher temperatures are entirely unnecessary when employing a 3–12% solids aqueous solution of the size. It has been found that raising the pH of the solution to about pH 7.5–9.0 e.g., by the addition of ammonia, sometimes provides an improvement in weave room performance.

The amount of size to be applied will vary somewhat according to the nature of the fibrous materials, the type of yarn, the denier or count and the like, but generally an amount is employed in the range of 0.5–15%, calculated on the solids and dry fabric. In general, 0.5 to 3% polymer solids for a filament yarn and 3% to 10% for a spun yarn, based on the weight of the yarn, provides suitably sized yarn. Similarly, the concentration of the sizing solution can vary over a fairly wide range, e.g., from about 2% to 15%.

In sizing operations, as distinguished from fruit and vegetable coating and the like, hygroscopic properties of the polymer must be minimized because weaving is normally done under relatively high humidity conditions. The use of polyurethanes end-blocked with alkoxy groups, i.e., alcohol terminated reaction products of the invention, have been found to be particularly valuable in terms of lowered hygroscopic tendencies.

A one-piece size is satisfactory but the invention is not limited thereto; suitable additives may be used if desired. For example, a small quantity of a silicone has been found to impart excellent qualities of lubricity thereby improving weaving efficiency. The amount of silicone can be varied from about 0.01% to 5%, based on resin solids. Somewhat larger quantities may be used in some instances but such uses are merely wasteful. Silicones are also very effective in reducing any stickiness which may tend to occur as a result of moisture pickup of hygroscopic polymers. The silicone rises through the polymer when a mixture thereof is cast into films from an aqueous medium. This provides a sort of two layer effect permitting the hydrophobic properties of the silicone to be effectively utilized.

The stability of the polymer in solution is excellent so that it may be stored in any of its liquid or solids forms and its good water solubility permits mixing at any point in the mill thereby eliminating a separate mixing operation, e.g., as required for starch and other conventional sizes. However, extreme pH should be avoided. Thus the polymers are preferably maintained at a pH between about 4 and 9.5.

Yarns which can be sized with the polymers of this invention include both spun fiber yarns and filament yarns. The invention is particularly applicable to spun and filament Dacron, cotton, nylon, Orlon, wool, viscose, acetate and blends of any two or more of the above.

The following examples are illustrative of the products and process of this invention but are not to be construed as limiting.

Example I

Heat 3,750 grams of polyethylene ether glycol having a molecular weight from about 6,000 to 7,000 (PEG–6000) in a 12 liter 3 neck round bottom flask equipped with a Teflon sealed stirrer, at 95 to 100° C. until melted, with the stirrer running at about 90 r.p.m. Vacuum dry the melt at 10 to 20 mm. of pressure until ebullition ceases. Complete drying by adding 250 ml. toluene and then removing it by distillation at 85 to 90° C. Mix 4.4 grams of a solution of 6% cobalt naphthenate in xylene with 1,250 ml. dry toluene and then add the resulting solution slowly to the melt, at 85° C. with stirring. Add 131 grams of tolylene 2,4-diisocyanate over a ten minute period and stir another 10 minutes at 90 r.p.m. There should be a very slight gas formation and a 2 to 5° temperature rise at this stage. Next, add dropwise about 10 drops (0.30 gram) of water over a 5 minute period, continue stirring at 90 r.p.m. for 15 minutes and then drop to 35–40 r.p.m. When the viscosity reaches about 200,000 cps. at 85–90° C. (90 to 120 min.), start adding 1,250 ml. of dry toluene as fast as possible (90 to 120 min.) without lowering the temperature below 85° C. or noticeably reducing the viscosity to avoid stopping the polymerization (90 to 120 min.). When the viscosity reaches 300,000 cps. (not over 15 min.), equip the flask with a reflux condenser and then add 104 grams of 1,2-propylene oxide. As soon as refluxing ceases, remove the excess propylene oxide by distilling at reduced pressure for 5 minutes. As soon as the viscosity reaches 500,000 cps. (usually 5 to 15 min.) stop the reaction by stirring in 100 grams of absolute ethanol. Stir in 5 liters of hot water and stop the heating. Transfer the reaction mixture to a 20 liter flask, add 7.5 liters of water and distill off toluene at reduced pressure at 70–80° C. There is obtained a clear, amber solution of about 25% solids having a viscosity of about 25,000 cps. at 25° C. as measured with a Brookfield viscometer.

Example II

The procedure of Example I is followed exactly that the reaction is terminated with 100 g. of n-butanol instead of ethanol. The viscosity at 25° C. of a 25% aqueous solution of a polymer produced according to this procedure is about 21,000 cps. as measured with a Brookfield viscometer.

Example III

The procedure of Example I is followed except that 120 g. of tolylene 2,4-diisocyanate and 3.3 g. of the 6% cobalt naphthenate solution is employed. The viscosity at 25° C. of a 25% aqueous solution of a polymer produced according to this procedure is about 15,000 cps. as measured with a Brookfield viscometer.

Example IV

The procedure of Example I is followed except that polyethylene ether glycol having an average molecular weight of 4,000 (Carbowax 4000) and 210 g. of tolylene 2,4-diisocyanate is employed. The viscosity at 25° C. of a 25% aqueous solution of a polymer produced according to this procedure is about 20,000 cps. as measured with a Brookfield viscometer.

Example V

The procedure of Example I is followed exactly except that isopropanol is substituted for the ethanol. The polymer produced according to this procedure is substantially identical to that obtained according to the procedure of Example I. Similarly, absolute methanol can be substituted for the ethanol to obtain substantially an identical product as measured with a Brookfield viscometer.

Example VI

The procedure of Example I is followed exactly except that 187 g. of diphenylmethane 4,4'-diisocyanate is substituted for the tolylene 2,4-diisocyanate. A polymer produced according to this procedure has a viscosity as a 25% aqueous solution at 25° C. of greater than 15,000 cps. as measured with a Brookfield viscometer.

What is claimed is:

1. As a new composition of matter, the water-soluble polymer characterized by the formula

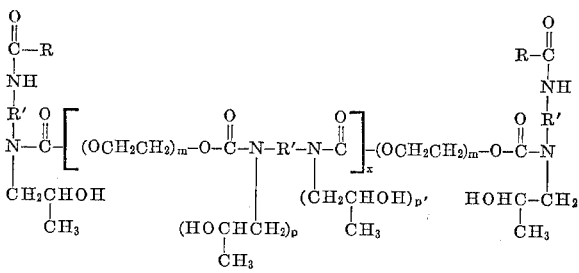

wherein R is an alkoxy group, R' is a divalent nonreactive radical selected from the group consisting of aliphatic radicals and aromatic radicals, $m$ is an integer from about 15 to about 450, $x$ is an integer of at least 10 and $p$ and $p'$ are two integers the sum of which is from about 0.1 to about 2.0, any valence of N which is not satisfied by a

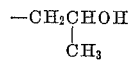

group being satisfied by an H.

2. As a textile size an aqueous solution of the composition of claim 1.

3. As a new composition of matter, the polymer characterized by the formula

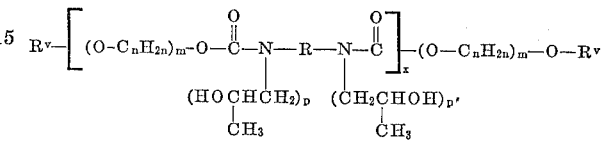

wherein R is a divalent nonreactive radical selected from the group consisting of aliphatic radicals and aromatic radicals, $R^v$ is a member selected from the group consisting of H and

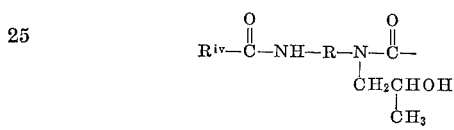

wherein $R^{iv}$ is an organic anionic residue having lost at least one active hydrogen atom, $n$ is an integer from about 2 to about 8, $m$ is an integer from about 15 to about 450, $x$ is an integer of at least 10 and $p$ and $p'$ are two integers the sum of which is from about 0.1 to about 2.0, any valence of N which is not satisfied by a —CH(R'')—CH(R'')OH group being satisfied by an H.

4. As a textile size, an aqueous solution of the composition of claim 3.

5. A process for the production of a water-soluble epoxy modified polyalkylene ether glycol diisocyanate polymer in which there is reacted under substantially anhydrous conditions a polyalkylene ether glycol having a molecular weight from 750 to 20,000 with at least 0.5 molar equivalents of an organic diisocyanate per mole equivalent of polyalkylene ether glycol whereby an isocyanate terminated product is produced in the presence of a catalyst suitable for the preparation of a polyurethane and at a temperature from about 70° C. to 150° C., the thus produced polyurethane being reacted with from about 0.1 to about 2.0 moles per mole amount of diisocyanate present in the polyurethane reaction product of a monofunctional epoxide selected from the group consisting of 1,2- and 1,3-monoepoxides and then reacting the resultant product with a chain terminating agent selected from the group consisting essentially of alcohols, ammonia, primary amines, cyclic secondary amines, inorganic salts having an active hydrogen, mercaptans, amides, alkanolamines and oximes.

6. The process according to claim 5 wherein the diisocyanate is an aryl diisocyanate.

7. The process according to claim 5 wherein the monofunctional epoxide is propylene oxide.

8. The process according to claim 5 wherein the chain terminating agent is isopropanol.

9. The process according to claim 5 wherein the catalyst suitable for the preparation of a polyurethane is cobalt naphthenate.

10. A process for the production of a water-soluble epoxy modified polyalkylene ether glycol diisocyanate polymer in which there is reacted under substantially anhydrous conditions a polyalkylene ether glycol having a molecular weight from 750 to 20,000 with between about 1.1 and 1.5 molar equivalents of an organic diisocyanate in the presence of a catalyst suitable for the preparation of a polyurethane and at a temperature from about 70° C. to 150° C., the thus produced polyurethane being reacted with from about 0.1 to about 2.0 moles per mole amount of diisocyanate present in the polyurethane reaction product of a monofunctional epoxide selected from the group consisting of 1,2- and 1,3-monoepoxides and then reacting the resultant product with a chain terminating agent selected from the group consisting essentially of alcohols, ammonia, primary amines, cyclic secondary amines, inorganic salts having an active hydrogen, mercaptans, amines, alkanolamines and oximes.

11. The process according to claim 10 wherein the polyethylene ether glycol has a molecular weight between about 2,000 and about 10,000.

12. The process according to claim 10 wherein the aryl diisocyanate is tolylene 2,4-diisocyanate.

13. The process according to claim 10 wherein the monofunctional epoxide is propylene oxide.

14. The process according to claim 10 wherein the chain terminating agent is isopropanol.

15. The process according to claim 10 wherein the catalyst suitable for the preparation of a polyurethane is cobalt naphthenate.

16. A process for the production of a water-soluble polymer in which there is reacted under substantially anhydrous conditions, a polyethylene ether glycol having a molecular weight of from about 6,000 to 8,000 with between about 1.1 and 1.5 molar equivalents of tolylene 2,4-diisocyanate, in the presence of a catalyst suitable for the preparation of a polyurethane and at a temperature between about 80° C. and 95° C., the thus produced polyurethane being reacted with from about 0.1 to about 2.0 molar equivalents, calculated on the tolylene 2,4-diisocyanate present in the polyurethane reaction product of propylene oxide and then reacted with a chain terminating agent selected from the group consisting essentially of alcohol, ammonia, primary amines, cyclic secondary amines, inorganic salts having an active hydrogen, mercaptans, amides, alkanolamines, and oximes.

17. The process according to claim 16 wherein the catalyst suitable for the preparation of a polyurethane is cobalt naphthenate.

18. The process according to claim 16 wherein the chain terminating agent is isopropanol.

19. As a new composition of matter, the polymer characterized by the formula

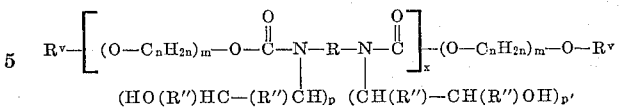

wherein R is a divalent nonreactive radical selected from the group consisting of aliphatic radicals and aromatic radicals, R″ is a member selected from the group consisting of H, nonreactive aliphatic radicals and nonreactive aromatic radicals, $R^v$ is a member selected from the group consisting of H and

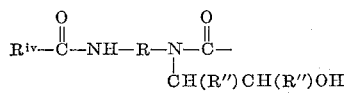

wherein $R^{iv}$ is an organic anionic residue having lost at least one active hydrogen atom, $n$ is an integer from about 2 to about 8, $m$ is an integer from about 15 to about 450, $x$ is an integer of at least 10 and $p$ and $p''$ are two integers the sum of which is from about 0.1 to about 2.0, any valence of N which is not satisfied by a

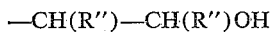

group being satisfied by an H.

20. As a textile size, an aqueous solution of the composition of claim 19.

References Cited by the Examiner
UNITED STATES PATENTS 2,830,038    4/1958    Pattison _____ 260—77.5
2,835,653    5/1958    Haas _____ 260—2

FOREIGN PATENTS 159,360    10/1954    Australia.

LEON J. BERCOVITZ, *Primary Examiner.*

JOSEPH L. SCHOFER, *Examiner.*

M. C. JACOBS, *Assistant Examiner.*